(12) United States Patent
Landman et al.

(10) Patent No.: US 12,216,976 B2
(45) Date of Patent: *Feb. 4, 2025

(54) EFFICIENT INTEGRATED CIRCUIT SIMULATION AND TESTING

(71) Applicant: PROTEANTECS LTD., Haifa (IL)

(72) Inventors: Evelyn Landman, Haifa (IL); Yair Talker, Binyamina (IL); Eyal Fayneh, Givatayim (IL); Yahel David, Kibbutz Gazit (IL); Shai Cohen, Haifa (IL); Inbar Weintrob, Givat-Ada (IL)

(73) Assignee: PROTEANTECS LTD., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,168

(22) Filed: Sep. 24, 2021

(65) Prior Publication Data

US 2022/0012395 A1 Jan. 13, 2022

Related U.S. Application Data

(63) Continuation of application No. 17/254,468, filed as application No. PCT/IL2019/050686 on Jun. 19, 2019, now Pat. No. 11,132,485.

(Continued)

(51) Int. Cl.
*G06F 30/30* (2020.01)
*G06F 30/3312* (2020.01)
(Continued)

(52) U.S. Cl.
CPC ...... *G06F 30/3312* (2020.01); *G06F 2111/08* (2020.01); *G06F 2119/06* (2020.01); *G06F 2119/22* (2020.01)

(58) Field of Classification Search
CPC ............. G06F 30/3312; G06F 2111/08; G06F 2119/22; G06F 2119/06; G06F 30/398
See application file for complete search history.

(56) References Cited

U.S. PATENT DOCUMENTS 4,555,663 A 11/1985 Shimizu
5,548,539 A 8/1996 Vlach et al.
(Continued)

FOREIGN PATENT DOCUMENTS

CN 1886668 A 12/2006
CN 101014991 A 8/2007
(Continued)

OTHER PUBLICATIONS

Vivek S Nandakumar et al, "Statistical static timing analysis flow for transistor level macros in a microprocessor"; 2010, 11th International Symposium on Quality Electronic Design (ISQED), pp. 163-170, Mar. 22, 2010. doi: 10.1109/ISQED.2010.5450412.
(Continued)

*Primary Examiner* — Jack Chiang
*Assistant Examiner* — Brandon Bowers
(74) *Attorney, Agent, or Firm* — The Roy Gross Law Firm, LLC; Roy Gross (57) ABSTRACT

A method comprising using at least one hardware processor for: running a Monte Carlo simulation of possible integrated circuit (IC) process variations of each of a plurality of IC cell types, wherein each of the plurality of IC cell types is defined by multiple specific transistors and multiple specific interconnects; based on the results of the Monte Carlo simulation, creating a library of IC cell types and their corresponding behavioral values for each of the possible IC process variations, and storing the library in a non-transient memory; receiving an IC design embodied as a digital file; correlating the received IC design with the library; and predicting a frequency distribution and a power distribution of ICs manufactured according to the IC design.

20 Claims, 6 Drawing Sheets

SYSTEM BLOCK DIAGRAM

Related U.S. Application Data (60) Provisional application No. 62/686,744, filed on Jun. 19, 2018.

(51) Int. Cl.
  *G06F 111/08* (2020.01)
  *G06F 119/06* (2020.01)
  *G06F 119/22* (2020.01)

(56) References Cited

U.S. PATENT DOCUMENTS

| | | | |
|---|---|---|---|
| 5,748,509 A | 5/1998 | Fewster | |
| 5,774,403 A | 6/1998 | Clark, II et al. | |
| 5,818,251 A | 10/1998 | Intrater | |
| 5,895,629 A | 4/1999 | Russell et al. | |
| 5,956,497 A * | 9/1999 | Ratzel | G06F 30/30 |
| | | | 716/108 |
| 5,966,527 A | 10/1999 | Krivokapic et al. | |
| 6,172,546 B1 | 1/2001 | Liu et al. | |
| 6,182,253 B1 | 1/2001 | Lawrence et al. | |
| 6,486,716 B1 | 11/2002 | Minami et al. | |
| 6,586,921 B1 | 7/2003 | Sunter | |
| 6,683,484 B1 | 1/2004 | Kueng et al. | |
| 6,807,503 B2 | 10/2004 | Ye et al. | |
| 6,873,926 B1 | 3/2005 | Diab | |
| 6,882,172 B1 | 4/2005 | Suzuki et al. | |
| 6,948,388 B1 | 9/2005 | Clayton et al. | |
| 7,038,483 B1 | 5/2006 | Suzuki et al. | |
| 7,067,335 B2 | 6/2006 | Weiner et al. | |
| 7,254,507 B2 | 8/2007 | Dosho et al. | |
| 7,288,958 B2 | 10/2007 | Takagi | |
| 7,369,893 B2 | 5/2008 | Gunderson | |
| 7,443,189 B2 | 10/2008 | Ramappa | |
| 7,455,450 B2 | 11/2008 | Liu et al. | |
| 7,501,832 B2 | 3/2009 | Spuhler et al. | |
| 7,649,373 B2 | 1/2010 | Tokunaga | |
| 7,701,246 B1 | 4/2010 | Plants et al. | |
| 7,818,601 B2 | 10/2010 | LaBerge | |
| 7,877,657 B1 | 1/2011 | Miller et al. | |
| 7,940,862 B2 | 5/2011 | Tanaka et al. | |
| 8,001,512 B1 | 8/2011 | White | |
| 8,086,978 B2 * | 12/2011 | Zhang | G06F 30/39 |
| | | | 716/109 |
| 8,170,067 B2 | 5/2012 | Zerbe et al. | |
| 8,275,596 B2 * | 9/2012 | Wason | G06F 30/367 |
| | | | 716/100 |
| 8,279,976 B2 | 10/2012 | Lin et al. | |
| 8,310,265 B2 | 11/2012 | Zjajo et al. | |
| 8,365,115 B2 | 1/2013 | Liu | |
| 8,418,103 B2 * | 4/2013 | Wang | G06F 30/36 |
| | | | 716/108 |
| 8,479,130 B1 | 7/2013 | Zhang et al. | |
| 8,633,722 B1 | 1/2014 | Lai | |
| 8,825,158 B2 | 9/2014 | Swerdlow | |
| 8,996,937 B2 | 3/2015 | Jain et al. | |
| 9,275,706 B2 | 3/2016 | Tam | |
| 9,424,952 B1 | 8/2016 | Seok et al. | |
| 9,490,787 B1 | 11/2016 | Kho et al. | |
| 9,536,038 B1 | 1/2017 | Quinton et al. | |
| 9,564,883 B1 | 2/2017 | Quinton et al. | |
| 9,564,884 B1 | 2/2017 | Quinton et al. | |
| 9,632,126 B2 | 4/2017 | Yoon | |
| 9,714,966 B2 | 7/2017 | Chen et al. | |
| 9,760,672 B1 | 9/2017 | Taneja et al. | |
| 9,791,834 B1 | 10/2017 | Nassar et al. | |
| 9,954,455 B2 | 4/2018 | Lin et al. | |
| 9,977,078 B2 | 5/2018 | Loke et al. | |
| 9,991,879 B2 | 6/2018 | Huang | |
| 10,490,547 B1 | 11/2019 | Ali et al. | |
| 10,509,104 B1 | 12/2019 | Dato | |
| 10,530,347 B2 | 1/2020 | Tang | |
| 11,036,266 B2 | 6/2021 | Srivastava et al. | |
| 11,081,193 B1 | 8/2021 | Tang | |
| 11,409,323 B2 | 8/2022 | Herberholz et al. | |
| 12,013,800 B1 | 6/2024 | Fayneh et al. | |
| 2004/0009616 A1 | 1/2004 | Huisman et al. | |
| 2004/0015793 A1 | 1/2004 | Saxena et al. | |
| 2004/0230385 A1 | 11/2004 | Bechhoefer et al. | |
| 2004/0230396 A1 | 11/2004 | Ye | |
| 2005/0053162 A1 | 3/2005 | Goishi | |
| 2005/0104175 A1 | 5/2005 | Itano et al. | |
| 2005/0114056 A1 | 5/2005 | Patel et al. | |
| 2005/0134350 A1 | 6/2005 | Huang et al. | |
| 2005/0134394 A1 | 6/2005 | Liu | |
| 2005/0154552 A1 | 7/2005 | Stroud et al. | |
| 2005/0285646 A1 | 12/2005 | Rashid | |
| 2006/0049886 A1 | 3/2006 | Agostinelli, Jr. et al. | |
| 2006/0224374 A1 | 10/2006 | Kwon et al. | |
| 2007/0110199 A1 | 5/2007 | Momtaz et al. | |
| 2007/0182456 A1 | 8/2007 | Agarwal et al. | |
| 2007/0288183 A1 | 12/2007 | Bulkes et al. | |
| 2008/0071489 A1 | 3/2008 | Wissel | |
| 2008/0074521 A1 | 3/2008 | Olsen | |
| 2008/0144243 A1 | 6/2008 | Mariani et al. | |
| 2008/0147355 A1 | 6/2008 | Fields et al. | |
| 2008/0183409 A1 | 7/2008 | Roberts et al. | |
| 2008/0186001 A1 | 8/2008 | Singh et al. | |
| 2008/0186044 A1 | 8/2008 | Singh | |
| 2008/0216033 A1 | 9/2008 | Bucossi et al. | |
| 2008/0231310 A1 | 9/2008 | Vijayaraghavan et al. | |
| 2008/0262769 A1 | 10/2008 | Kadosh | |
| 2009/0027077 A1 | 1/2009 | Vijayaraghavan | |
| 2009/0076753 A1 | 3/2009 | Vijayaraghavan et al. | |
| 2009/0096495 A1 | 4/2009 | Keigo | |
| 2009/0183043 A1 | 7/2009 | Niwa | |
| 2009/0222775 A1 * | 9/2009 | Idgunji | G06F 30/327 |
| | | | 716/106 |
| 2009/0230947 A1 | 9/2009 | Sumita | |
| 2009/0244998 A1 | 10/2009 | Kim | |
| 2009/0273550 A1 | 11/2009 | Vieri et al. | |
| 2009/0278576 A1 | 11/2009 | Chakravarty | |
| 2009/0306953 A1 | 12/2009 | Liu | |
| 2010/0153896 A1 | 6/2010 | Sewall et al. | |
| 2010/0251046 A1 | 9/2010 | Mizuno et al. | |
| 2010/0253382 A1 | 10/2010 | Wang et al. | |
| 2011/0093830 A1 | 4/2011 | Chen | |
| 2011/0102091 A1 | 5/2011 | Yeric | |
| 2011/0109377 A1 | 5/2011 | Fujibe | |
| 2011/0113298 A1 | 5/2011 | Van Den Eijnden | |
| 2011/0169537 A1 | 7/2011 | Ma | |
| 2011/0175658 A1 | 7/2011 | Nomura | |
| 2011/0187433 A1 | 8/2011 | Baumann et al. | |
| 2011/0267096 A1 | 11/2011 | Chlipala | |
| 2011/0295403 A1 | 12/2011 | Higuchi et al. | |
| 2011/0315986 A1 | 12/2011 | Kaneda et al. | |
| 2012/0025846 A1 | 2/2012 | Minas et al. | |
| 2012/0038388 A1 | 2/2012 | Tseng et al. | |
| 2012/0051395 A1 | 3/2012 | Chen et al. | |
| 2012/0063524 A1 | 3/2012 | Stott et al. | |
| 2012/0074973 A1 | 3/2012 | Baldwin et al. | |
| 2012/0163074 A1 | 6/2012 | Franca-Neto et al. | |
| 2012/0170616 A1 | 7/2012 | Tsai et al. | |
| 2012/0187991 A1 | 7/2012 | Sathe | |
| 2012/0212246 A1 | 8/2012 | Benjamin et al. | |
| 2012/0217976 A1 | 8/2012 | Clarkson | |
| 2012/0221906 A1 | 8/2012 | Shetty et al. | |
| 2012/0242490 A1 | 9/2012 | Ramaswami | |
| 2013/0088256 A1 | 4/2013 | Chlipala et al. | |
| 2013/0226491 A1 | 8/2013 | Miguelanez, II | |
| 2013/0241690 A1 | 9/2013 | Wallace et al. | |
| 2013/0293270 A1 | 11/2013 | Lee et al. | |
| 2013/0335875 A1 | 12/2013 | Baumann | |
| 2014/0132293 A1 | 5/2014 | Abadir | |
| 2014/0132315 A1 | 5/2014 | Sharma et al. | |
| 2014/0143586 A1 | 5/2014 | Dalumi et al. | |
| 2014/0184243 A1 | 7/2014 | Iyer et al. | |
| 2014/0254734 A1 | 9/2014 | Abdelmoneum | |
| 2015/0061707 A1 | 3/2015 | Balasubramanian et al. | |
| 2015/0077136 A1 | 3/2015 | Li | |
| 2015/0121158 A1 | 4/2015 | Wang et al. | |
| 2015/0199223 A1 | 7/2015 | Banerjee et al. | |
| 2015/0332451 A1 | 11/2015 | Amzaleg | |
| 2015/0355033 A1 | 12/2015 | Zhang et al. | |

(56) References Cited

U.S. PATENT DOCUMENTS

| | | |
|---|---|---|
| 2015/0365049 A1 | 12/2015 | Ozawa |
| 2016/0033574 A1 | 2/2016 | Serrer et al. |
| 2016/0042784 A1 | 2/2016 | Rim et al. |
| 2016/0072511 A1 | 3/2016 | Maekawa |
| 2016/0087643 A1 | 3/2016 | Nozaki |
| 2016/0125434 A1 | 5/2016 | Kohn et al. |
| 2016/0131708 A1 | 5/2016 | Huang et al. |
| 2016/0153840 A1 | 6/2016 | Huang et al. |
| 2016/0156176 A1 | 6/2016 | Kunz, Jr. |
| 2016/0164503 A1 | 6/2016 | Kim |
| 2016/0203036 A1 | 7/2016 | Mezic et al. |
| 2016/0254804 A1 | 9/2016 | Meng |
| 2017/0038265 A1 | 2/2017 | Abdelmoneum et al. |
| 2017/0093399 A1 | 3/2017 | Atkinson et al. |
| 2017/0160339 A1 | 6/2017 | Jenkins |
| 2017/0179173 A1 | 6/2017 | Mandai et al. |
| 2017/0199089 A1 | 7/2017 | Fritchman et al. |
| 2017/0199228 A1 | 7/2017 | Hsieh et al. |
| 2017/0214516 A1 | 7/2017 | Rivaud et al. |
| 2017/0329391 A1 | 11/2017 | Jaffari |
| 2017/0344102 A1 | 11/2017 | Kolla |
| 2017/0345490 A1 | 11/2017 | Yoshimoto et al. |
| 2017/0364818 A1 | 12/2017 | Wu et al. |
| 2018/0034549 A1 | 2/2018 | Kikuchi |
| 2018/0109245 A1 | 4/2018 | Takagi |
| 2018/0183413 A1 | 6/2018 | Wong |
| 2018/0365974 A1 | 12/2018 | Haas et al. |
| 2019/0019096 A1 | 1/2019 | Yoshida et al. |
| 2019/0117122 A1 | 4/2019 | Kurachi et al. |
| 2019/0305074 A1 | 10/2019 | Kande et al. |
| 2020/0028514 A1 | 1/2020 | Hanke |
| 2020/0203333 A1 | 6/2020 | Chen et al. |
| 2020/0209070 A1 | 7/2020 | Tang et al. |
| 2020/0313664 A1 | 10/2020 | Azam et al. |
| 2022/0260630 A1 | 8/2022 | Fayneh et al. |
| 2022/0349935 A1 | 11/2022 | Fayneh et al. |
| 2023/0098071 A1 | 3/2023 | Chonnad et al. |

FOREIGN PATENT DOCUMENTS

| | | |
|---|---|---|
| CN | 101241429 A | 8/2008 |
| CN | 101344898 A | 1/2009 |
| CN | 101915625 B1 | 7/2012 |
| CN | 102422169 A | 11/2014 |
| CN | 105210188 A | 12/2015 |
| CN | 106959400 A | 7/2017 |
| CN | 108534866 A | 9/2018 |
| CN | 113466670 A | 10/2021 |
| DE | 102007002253 A1 | 7/2007 |
| DE | 102014216786 B3 | 10/2015 |
| DE | 102012219971 A1 | 7/2016 |
| EP | 962991 A1 | 12/1999 |
| EP | 1262755 A1 | 12/2002 |
| EP | 2006784 A1 | 12/2008 |
| EP | 2060924 A1 | 5/2009 |
| EP | 2413150 A1 | 2/2012 |
| EP | 2770313 A1 | 8/2014 |
| IN | 102273077 B | 9/2014 |
| JP | S57116228 A | 7/1982 |
| JP | 2000215693 A | 8/2000 |
| JP | 2002243800 A | 8/2002 |
| JP | 2008147245 A | 6/2008 |
| JP | 2009065533 A | 3/2009 |
| JP | 2012037238 A | 2/2012 |
| JP | 2009201348 A | 7/2013 |
| JP | 2016111563 A | 6/2016 |
| KR | 101232207 B1 | 2/2013 |
| KR | 2013110989 A | 10/2013 |
| KR | 20150073199 A | 6/2015 |
| TW | 200914841 A | 4/2009 |
| TW | 201614256 A | 3/2016 |
| TW | 201709669 A | 3/2017 |
| WO | 2005080099 A1 | 9/2005 |
| WO | 2013070218 A1 | 5/2013 |
| WO | 2013027739 A1 | 3/2015 |
| WO | 2019097516 A1 | 5/2019 |
| WO | 2019102467 A1 | 5/2019 |
| WO | 2019135247 A1 | 7/2019 |
| WO | 2019202595 A1 | 10/2019 |
| WO | 2019244154 A1 | 12/2019 |
| WO | 2020141516 A1 | 7/2020 |
| WO | 2020230130 A1 | 11/2020 |
| WO | 2021019539 A1 | 2/2021 |
| WO | 2021111444 A1 | 6/2021 |
| WO | 2021214562 A1 | 10/2021 |
| WO | 2022/009199 A1 | 1/2022 |
| WO | 2022215076 A1 | 10/2022 |
| WO | 2023084528 A1 | 5/2023 |
| WO | 2023084529 A1 | 5/2023 |
| WO | 2023238128 A1 | 12/2023 |
| WO | 2024/166103 A1 | 8/2024 |

OTHER PUBLICATIONS

Jing Li et al, "Variation Estimation and Compensation Technique in Scaled Ltps TFT Circuits for Low-Power Low-Cost Applications"; IEEE Transactions on Computer-Aided Design of Integrated Circuits and Systems, vol. 28(1): 46-59, Jan. 1, 2009. doi: 10.1109/TCAD.2008.2009149.

Xie Qing et al "Variation-Aware Joint Optimization of the Supply Voltage and Sleep Transistor Size for 7nm FinFET Technology"; 2014 IEEE 32nd international conference on computer design, pp. 380-385, Oct. 19, 2014. doi: 10.1109/ICCD.2014.6974709.

Rebaud B et al , "Timing slack monitoring under process and environmental variations: Application to a DSP performance optimization"; Microelectronics Journal vol. 42 Issue 5, pp. 718-732, Feb. 8, 2011. https://doi.org/10.1016/j.mejo.2011.02.005.

Dierickx B et al, "Propagating variability from technology to system Level"; Physics of Semiconductor Devices, pp. 74-79, Dec. 16, 2007. doi: 10.1109/IWPSD.2007.4472457.

Kan Takeuchi et al; "FEOL/BEOL wear-out estimator using stress-to-frequency conversion of voltage/temperature-sensitive ring oscillators for 28nm automotive MCUs"; IEEE, pp. 265-268, Oct. 20, 2016. Retrieved Aug. 3, 2021; DOI: 10.1109/ESSCIRC.2016.7598293.

Kan Takeuchi et al; "Wear-out stress monitor utilising temperature and voltage sensitive ring oscillators" IET Circuits, Devices & Systems. vol. 12 No. 2, pp. 182-188, Jan. 15, 2018. Retrieved Aug. 3, 2021 from: https://ietresearch.onlinelibrary.wiley.com/doi/10.1049/iet-cds.2017.0153.

Kan Takeuchi et al; "Experimental Implementation of 8.9Kgate Stress Monitor in 28nm MCU along with Safety Software Library for IoT Device Maintenance"; IEEE International Reliability Physics Symposium (IRPS). Mar. 31, 2019; Retrieved Aug. 3, 2021 from: https://ieeexplore.ieee.org/document/8720583.

James P. Hofmeister, et al, "Ball Grid Array (BGA) Solder Joint Intermittency Detection: SJ BIST™", IEEE Aerospace Conference Proceedings, Apr. 2008, paper #1148, Version 1; Retrieved Aug. 3, 2021 from: https://www.researchgate.net/publication/224314758_Ball_Grid_Array_BGA_Solder_Joint_Intermittency_Detection_SJ_BIST.

Paulheim H, Meusel R. "A decomposition of the outlier detection problem into a set of supervised learning problems", Machine Learning, Sep. 2015, vol. 100 Issue 2, pp. 509-531. Retrieved Aug. 3, 2021 from: https://link.springer.com/article/10.1007/s10994-015-5507-y.

Zhang L, Marron JS, Shen H, Zhu Z., "Singular value decomposition and its visualization", Journal of Computational and Graphical Statistics, Dec. 2007, vol. 6 Issue 4, pp. 833-854. Retrieved Aug. 3, 2021 from: https://ur.booksc.eu/book/59645154/3e694b.

Shinkai, Ken-ichi et al. "Device-parameter estimation with on-chip variation sensors considering random variability."; In 16th Asia and South Pacific Design Automation Conference (ASP-DAC 2011), pp. 683-688. IEEE, Jan. 25, 2011. Retrieved Aug. 3, 2021 from: http://www-ise2.ist.osaka-u.ac.jp/~hasimoto/pman2/data/pdf/152.pdf.

(56) References Cited

OTHER PUBLICATIONS

Weiwei Shan et al. "An improved timing error prediction monitor for wide adaptive frequency scaling"; IEICE Electronics Express, vol. 14, No. 21, pp. 1-6, Oct. 20, 2017. Retrieved Aug. 3, 2021; DOI: 10.1587/elex.14.20170808.
Agilent Technologies; "Clock Jitter Analysis with femto-second resolution"; Jan. 1, 2008.
Yousuke Miyake et al; "Temperature and voltage estimation using ring-oscillator-based monitor for field test"; IEEE 23rd Asian Test Symposium; pp. 156-161, Nov. 16, 2014. Retrieved Aug. 3, 2021; DOI 10.1109/ATS.2014.38.
Datta et al.; "Analysis of a Ring Oscillator Based on Chip Thermal Sensor IN 65nm TECHNOLOGY"; Online at: https://web.archive.org/web/20140328234617/http://www-unix.ecs.umass.edu/~dkumar/lab4_658_report/lab4_report.htm; Sep. 5, 2018.
Wolf et al; "Collaborative Monitors for Embedded System Security"; First Workshop on Embedded Security in conjunction with EMSOFT '06, Oct. 6, 2006 Seoul, South Korea.
Sandeep Kumar Samal et al; "Machine Learning Based Variation Modeling and Optimization for 3D ICs"; J. Inf. Commun. Converg. Eng. 14(4): 258-267, Dec. 2016. Retrieved Aug. 3, 2021; DOI: 10.6109/jicce.2016.14.4.258.
Yin-Nien Chen et al; "Impacts of Work Function Variation and Line-Edge Roughness on TFET and FinFET Devices and 32-Bit CLA Circuits"; J. Low Power Electron. Appl. 2015, 5, 101-115. May 21, 2015. Retrieved Aug. 3, 2021; doi:10.3390/jlpea5020101.
Yong Zhao et al; "A Genetic Algorithm Based Remaining Lifetime Prediction for a VLIW Processor Employing Path Delay and IDDX Testing"; IEEE; Apr. 12, 2016. Retrieved Aug. 3, 2021 from: https://ieeexplore.ieee.org/abstract/document/7483805.
Dan Ernst et al; "Razor: Circuit-Level Correction of Timing Errors for Low-Power Operation"; IEEE Computer Society. Nov.-Dec. 2004.
Dan Ernst et al; "Razor: A Low-Power Pipeline Based on Circuit-Level Timing Speculation"; Appears in the 36th Annual International Symposium on Microarchitecture (MICRO-36). Dec. 2003.
International Search Report for International Application No. PCT/IL2019/050686, mailed Nov. 3, 2019, 2pp.
PCT Written Opinion for International Application No. PCT/IL2019/050686, mailed Nov. 3, 2019, 4pp.
PCT International Preliminary Report on Patentability for International Application No. PCT/IL2019/050686, completed Oct. 31, 2019, 5pp.
Zheng K., "A Comparison of Digital Droop Detection Techniques in ASAP7 FinFET"; Research Review. Sep. 2019.
Hongge Chen, "Novel Machine Learning Approaches for Modeling Variations in Semiconductor Manufacturing," Master hesis, Jun. 2017.
Jianfeng Zhang et al, "Parameter Variation Sensing and Estimation in Nanoscale Fabrics"; Journal of Parallel and Distributed Computing; vol. 74, Issue 6, pp. 2504-2511, Jun. 1, 2014. https://doi.org/10.1016/j.jpdc.2013.08.005.
I. A. K. M. Mahfuzul et al, "Variation-sensitive monitor circuits for estimation of Die-to-Die process variation"; 2011 EEE ICMTS International Conference on Microelectronic Test Structures, Amsterdam, Netherlands; pp. 153-157, Apr. 4-7, 2011. doi: 10.1109/ICMTS.2011.5976878.
Mng Qiao et al., "Variability-aware compact modeling and statistical circuit validation on SRAM test array"; Proceedings of the SPIE, vol. 9781, Design-Process-Technology Co-optimization for Manufacturability X, Mar. 16, 2016. DOI: 10.1117/12.2219428.
David Herres, "The Eye Diagram: What is it and why is it used?"; Online at: https://www.testandmeasurementtips.com/basics-eye-diagrams/, Aug. 16, 2016.
Yu-Chuan Lin et al, "A 10-GB/s Eye-Opening Monitor Circuit for Receiver Equalizer Adaptations in 65-nm CMOS;" in EEE Transactions on Very Large Scale Integration (VLSI) Systems, vol. 28, No. 1, pp. 23-34, Jan. 2020. doi: 10.1109/TVLSI.2019.2935305.

Nidhal Selmane, Shivam Bhasin, Sylvain Guilley, Tarik Graba, Jean-Luc Danger. "WDDL is Protected Against Setup Time Violation Attacks." CHES, Sep. 2009, Lausanne, Switzerland. pp. 73-83. DOI: 10.1109/FDTC.2009.40.
Nidhal Selmane, Shivam Bhasin, Sylvain Guilley, Jean-Luc Danger. "Security evaluation of application-specific Integrated circuits and field programmable gate arrays against setup time violation attacks." IET Inf. Secur., 2011, vol. 5, Iss. 4, pp. 181-190. doi: 10.1049/iet-ifs.2010.0238.
Mridul Agarwal et al, "Circuit Failure Prediction and its Application to Transistor Aging"; 5th IEEE VLSI Test Symposium (VTS'07), pp. 277-286, May 6-10, 2007. doi: 10.1109/VTS.2007.22.
Keith A. Bowman et al., "Energy-Efficient and Metastability-Immune Resilient Circuits for Dynamic Variation Tolerance"; IEEE Journal of Solid-State Circuits vol. 44, Issue 1, pp. 49-63, Jan. 2009. doi: 10.1109/JSSC.2008.2007148.
Shidhartha Das et al, "A Self-Tuning DVS Processor Using Delay-Error Detection and Correction"; IEEE Journal of Solid-State Circuits; vol. 41, Issue 4, pp. 792-804, Apr. 2006. doi: 10.1109/JSSC.2006.870912.
Shidhartha Das et al, "RazorII: In Situ Error Detection and Correction for PVT and SER Tolerance" 2008 IEEE International Solid-State Circuits Conference—Digest of Technical Papers, Feb. 3-7, 2008. doi: 10.1109/JSSC.2008.2007145.
Ramyanshu Datta et al, "On-Chip Delay Measurement for Silicon Debug"; GLSVLSI '04: Proceedings of the 14th ACM Great Lakes symposium on VLSI; pp. 145-148, Apr. 26-28, 2004. https://doi.org/10.1145/988952.988988.
Alan Drake et al, "A Distributed Critical-Path Timing Monitor for a 65nm High-Performance Microprocessor"; 2007 IEEE International Solid-State Circuits Conference. Digest of Technical Papers; Feb. 11-15, 2007. doi: 10.1109/ISSCC.2007.373462.
Matthias Eireiner et al, "In-Situ Delay Characterization and Local Supply Voltage Adjustment for Compensation of Local Parametric Variations"; IEEE Journal of Solid-State Circuits; vol. 42, Issue 7, pp. 1583-1592, Jul. 2007. doi: 10.1109/JSSC.2007.896695.
Matthew Fojtik et al, "Bubble Razor: An architecture-independent approach to timing-error detection and correction"; 2012 IEEE International Solid-State Circuits Conference; Feb. 19-23, 2012. doi: 10.1109/ISSCC.2012.6177103.
Matthew Fojtik et al, "Bubble Razor: Eliminating Timing Margins in an ARM Cortex-M3 Processor in 45 nm CMOS Using Architecturally Independent Error Detection and Correction"; IEEE Journal of Solid-State Circuits; vol. 48, Issue 1, pp. 66-81, Jan. 2013. doi: 10.1109/JSSC.2012.2220912.
Piero Franco et al, "On-Line Delay Testing of Digital Circuits"; Proceedings of IEEE VLSI Test Symposium; Apr. 25-28, 1994. doi: 10.1109/VTEST.1994.292318.
V. Huard et al, "Adaptive Wearout Management with in-situ aging monitors"; 2014 IEEE International Reliability Physics Symposium; Jun. 1-5, 2014. pp. 6B.4.1-6B.4.11, doi: 10.1109/IRPS.2014.6861106.
Liangzhen Lai et al, "SlackProbe: A Flexible and Efficient In Situ Timing Slack Monitoring Methodology"; IEEE Transactions on Computer-Aided Design of Integrated Circuits and Systems; vol. 33, Issue 8, pp. 1168-1179, Aug. 2014. doi: 10.1109/TCAD.2014.2323195.
M. Saliva et al, "Digital Circuits Reliability with In-Situ Monitors in 28nm Fully Depleted SOI"; 2015 Design, Automation Mar. 9-13, 2015. doi: 10.7873/DATE.2015.0238.
Martin Wirnshofer et al, "A Variation-Aware Adaptive Voltage Scaling Technique based on In-Situ Delay Monitoring"; 14th IEEE International Symposium on Design and Diagnostics of Electronic Circuits and Systems; pp. 261-266, Apr. 13-15, 2011. doi: 10.1109/DDECS.2011.5783090.
Martin Wirnshofer et al, "An Energy-Efficient Supply Voltage Scheme using In-Situ Pre-Error Detection for on-the-fly Voltage Adaptation to PVT Variations"; 2011 International Symposium on Integrated Circuits; pp. 94-97, Dec. 12-14, 2011. doi: 10.1109/ISICir.2011.6131888.

(56) References Cited

OTHER PUBLICATIONS

Martin Wirnshofer et al, "On-line supply voltage scaling based on in situ delay monitoring to adapt for PVTA variations"; Journal of Circuits, Systems and Computers; vol. 21, No. 08, Mar. 7, 2012. doi: 10.1142/S0218126612400270.

S. Mhira et al, "Dynamic Adaptive Voltage Scaling in Automotive environment"; 2017 IEEE International Reliability Physics Symposium (IRPS); pp. 3A-4.1-3A-4.7, Apr. 2-6, 2017. doi: 10.1109/IRPS.2017.7936279.

A. Benhassain et al, "Early failure prediction by using in-situ monitors: Implementation and application results"; Online at: https://ceur-ws.org/Vol-1566/Paper6.pdf, Mar. 18, 2016.

Charles R. Lefurgy et al, "Active Management of Timing Guardband to Save Energy in POWER7"; 2011 44th Annual IEEE/ACM International Symposium on Microarchitecture (MICRO); pp. 1-11; Dec. 3-7, 2011.

C. R. Lefurgy et al., "Active Guardband Management in Power7+ to Save Energy and Maintain Reliability"; in IEEE Micro, vol. 33, No. 4, pp. 35-45, Jul.-Aug. 2013. doi: 10.1109/MM.2013.52.

B. Zandian et al, "Cross-layer resilience using wearout aware design flow"; 2011 IEEE/IFIP 41st International Conference on Dependable Systems & Networks (DSN), pp. 279-290, Jun. 27-30, 2011. doi: 10.1109/DSN.2011.5958226.

M. Cho et al., "Postsilicon Voltage Guard-Band Reduction in a 22 nm Graphics Execution Core Using Adaptive Voltage Scaling and Dynamic Power Gating"; in IEEE Journal of Solid-State Circuits, vol. 52, No. 1, pp. 50-63, Jan. 4, 2017. doi: 10.1109/JSSC.2016.2601319.

W. Shan et al, "Timing error prediction based adaptive voltage scaling for dynamic variation tolerance"; 2014 IEEE Asia Pacific Conference on Circuits and Systems (APCCAS), pp. 739-742, Nov. 17-20, 2014. doi: 10.1109/APCCAS.2014.7032887.

J. Li et al, "Robust and in-situ self-testing technique for monitoring device aging effects in pipeline circuits"; 2014 51st ACM/EDAC/IEEE Design Automation Conference (DAC), pp. 1-6, Jun. 1-5, 2014.

X. Shang et al, "A 0.44V-1.1V 9-transistor transition-detector and half-path error detection technique for low power applications"; 2017 IEEE Asian Solid-State Circuits Conference (A-SSCC), pp. 205-208, Nov. 6-8, 2017. doi: 10.1109/ASSCC.2017.8240252.

Liangzhen Lai et al, "Accurate and inexpensive performance monitoring for variability-aware systems"; 2014 19th Asia and South Pacific Design Automation Conference (ASP-DAC), pp. 467-473, Jan. 20-23, 2014. doi: 10.1109/ASPDAC.2014.6742935.

Martin Wirnshofer et al, "Adaptive voltage scaling by in-situ delay monitoring for an image processing circuit"; 2012 IEEE 15th International Symposium on Design and Diagnostics of Electronic Circuits & Systems (DDECS), pp. 205-208, Apr. 18-20, 2012. doi: 10.1109/DDECS.2012.6219058.

Youhua Shi et al, "Suspicious timing error prediction with in-cycle clock gating"; International Symposium on Quality Electronic Design (ISQED), pp. 335-340, Mar. 4-6, 2013. doi: 10.1109/ISQED.2013.6523631.

Youhua Shi et al, "In-situ timing monitoring methods for variation-resilient designs"; 2014 IEEE Asia Pacific Conference on Circuits and Systems (APCCAS), pp. 735-738, Nov. 17-20, 2014. doi: 10.1109/APCCAS.2014.7032886.

Jongho Kim et al., "Adaptive delay monitoring for wide voltage-range operation"; 2016 Design, Automation & Test in Europe Conference & Exhibition (DATE), pp. 511-516, Mar. 14-18, 2016. DOI: 10.3850/9783981537079 0330.

Xiaobin Yuan et al., "Design Considerations for Reconfigurable Delay Circuit to Emulate System Critical Paths"; in IEEE Transactions on Very Large Scale Integration (VLSI) Systems, vol. 23, No. 11, pp. 2714-2718, Nov. 2015. doi: 10.1109/TVLSI.2014.2364785.

\* cited by examiner

EFFICIENT INTEGRATED CIRCUIT SIMULATION AND TESTING

CROSS REFERENCE TO RELATED APPLICATIONS

This application is a continuation of U.S. National Patent application Ser. No. 17/254,468 filed on Dec. 21, 2020, which is a National Phase of PCT Patent Application No. PCT/IL2019/050686 having an International filing date of Jun. 19, 2019, entitled "EFFICIENT INTEGRATED CIRCUIT SIMULATION AND TESTING", which claims the benefit of priority of U.S. Provisional Patent Application No. 62/686,744, filed Jun. 19, 2018, entitled "EFFICIENT INTEGRATED CIRCUIT SIMULATION AND TESTING.". The contents of the above applications are all incorporated by reference as if fully set forth herein in their entirety.

BACKGROUND

The invention relates to the field of electronic design tools (EDAs) for integrated circuit (IC) design testing.

Integrated circuits may include analog and digital electronic circuits on a flat semiconductor substrate, such as a silicon (Si) wafer. Microscopic transistors are printed onto the substrate using photolithography techniques to produce complex circuits of billions of transistors in a very small area, making modern electronic circuit design using ICs both low cost and high performance. ICs are produced by assembly lines of factories, termed "foundries", that have commoditized the production of ICs, such as complementary metal-oxide-semiconductor (CMOS) ICs. Digital ICs contain billions of transistors arranged in functional and/or logical units on the wafer, and are packaged in a metal, plastic, glass, ceramic casing, and/or the like.

ICs are tested during production against power/performance specifications, such as by using wafer tests, package tests, circuit tests, end-user device operational tests, and/or the like. For example, wafer testing may determine which ICs do not meet power/performance specifications on each wafer tested, and the underperforming ICs may be discarded. As another example, package/circuit/device testing may test the product operation prior to end-user use, and underperforming products/batches be discarded. As a further example, marketing, warranty, and maintenance statistics may reflect on the compliance between the requirements, specifications, design, and testing during product development. Each of these types of tests may produce lists of underperforming products that may be analyzed to improve the design of the next generation of products and increase the production yield.

Yield is a common metric in semiconductor manufacturing and test. It measures the percentage of ICs in a finished wafer or packaged batch of ICs that pass all tests and function properly. ICs that do not meet the power/performance specifications impact the yield, since they may eventually be discarded.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method comprising using at least one hardware processor for: running a Monte Carlo simulation of possible integrated circuit (IC) process variations of each of a plurality of IC cell types, wherein each of the plurality of IC cell types is defined by multiple specific transistors and multiple specific interconnects; based on the results of the Monte Carlo simulation, creating a library of IC cell types and their corresponding behavioral values for each of the possible IC process variations, and storing the library in a non-transient memory; receiving an IC design embodied as a digital file; correlating the received IC design with the library; and predicting a frequency distribution and a power distribution of ICs manufactured according to the IC design.

Another embodiment provides a method comprising using at least one hardware processor for: running a Monte Carlo simulation of possible integrated circuit (IC) process variations of each of a plurality of IC cell types, wherein each of the plurality of IC cell types is defined by multiple specific transistors and multiple specific interconnects; based on the results of the Monte Carlo simulation, creating a library of IC cell types and their corresponding behavioral values for each of the possible IC process variations, and storing the library in a non-transient memory; receiving an IC design embodied as a digital file; applying a path selection algorithm to the IC design, wherein the applying comprises: retrieving, from the library, behavioral values that pertain to cell types that exist in the IC design. In embodiments, the method further comprises running an electronic circuit simulation of possible IC process variations of paths in the IC design, based on the behavioral values retrieved from the library, to produce a ranked list of critical paths, out of the paths in the IC design and/or running an electronic circuit simulation of the IC design to identify possible IC process variations, based on the behavioral values retrieved from the library. In embodiments, the method further comprises identifying a ranked list of critical paths, out of the paths in the IC design, based on the behavioral values retrieved from the library. In embodiments, the method further comprises predicting a frequency distribution and/or a power distribution of ICs manufactured according to the IC design, based on the paths in the IC design.

In some embodiments, the behavioral values are values that affect at least one operational parameter of an IC manufactured based on the IC design, wherein the at least one operational parameter is selected from the group consisting of: voltage, current, delay, and frequency.

In some embodiments, the library of IC cell types comprises an operational model for each IC cell type. In some embodiments, the operational model for each IC cell type comprises aging degradation data. In some embodiments, the operational model for each IC cell type comprises a Static Timing Analysis (STA) model.

In some embodiments, the electronic circuit simulation is performed using SPICE (Simulation Program with Integrated Circuit Emphasis).

In some embodiments, the method further comprises: receiving Post-Si data, derived from ICs manufactured according to the IC design; and adjusting the stored library based on the received data.

In some embodiments, the method further comprises: receiving an on-chip measurement from ICs manufactured according to the IC design; using the on-chip measurement as an input to an estimator, the Post-Si data being providing as an output from the estimator.

In some embodiments, the Post-Si data is derived from one or more on-chip sensors.

In some embodiments, the one or more on-chip sensors comprise at least one of: a timing-margin sensor; a delay sensor; a leakage sensor; a voltage sensor; and a thermal sensor.

In some embodiments, the method further comprises: manufacturing ICs according to the IC design; and setting one or more operational parameters of the manufactured ICs based on the stored library.

In some embodiments, the method further comprises: setting one or more manufacturing parameters based on the stored library; and manufacturing ICs according to the IC design and the manufacturing parameters.

Another embodiment provides a computer program product comprising a non-transitory computer-readable storage medium having program code embodied therewith, the program code executable by at least one hardware processor to perform the actions of any one of the preceding embodiments.

A further embodiment provides a system comprising: (a) a non-transitory computer-readable storage medium having program code embodied therewith, the program code executable by at least one hardware processor to perform the actions of any one of the preceding embodiments; and (b) at least one hardware processor configured to execute the program code.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
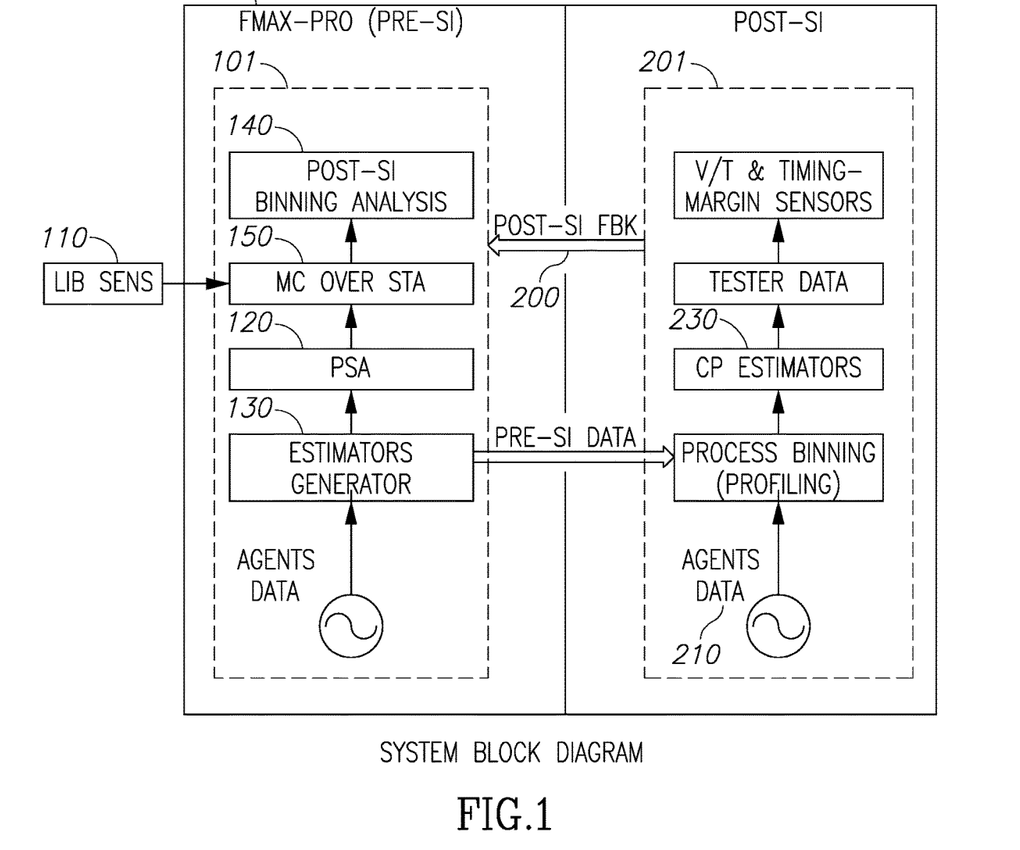
FIG. 1 shows a block diagram of a system, in accordance with some embodiments.

Disclosed herein are devices, systems, computer program products, and methods for predicting, for example, the frequency and/or power distribution of a manufactured (Post-Si) logic integrated circuit (IC). Disclosed techniques may predict the logic paths within the IC that will limit its frequency, i.e. Critical Paths (CP). The prediction is done at the design stage (Pre-Si) for each Si-manufacturing point that is defined by the Si-manufacturing distribution. The techniques herein allow to predict, analyze, and determine the maximum-frequency (frequency binning) and power distribution (power binning) of a manufactured IC based on a given Si-manufacturing space. The techniques use Post-Si data as a feedback to improve its future analysis and prediction processes. The improvement impacts the quality (for example, in terms of yield) and time-to-market (TTM) of the current manufactured IC and future designs (of either the same version or new designs). The embodiment that is illustrated (as a system block diagram) in FIG. 1 may be composed of one or more of the following five parts:

1. An Electronic Design Automation (EDA) tool-set 100.
   1.1. Lib-Sens: Library-Sensitivity explorer tool 110.
   1.2. PSA: Path-Sensitivity-Analysis tool 120.
   1.3. Production-View: Silicon production view at design: Yield-power/performance analysis tool, to reach decisions to reduce power/area, increase performance and/or expedite time to tape-out.
2. Sensors/Agents 210 that are an electrical circuit implemented on the die (IC).
3. Machine learning (ML) tools 130, 230 that are used to build Estimators/Functions that are used Pre-Si 101 and Post-Si 201 to estimate CP delays and power consumption of an IC using the readout from the Agents 210 as their argument.
4. Feedback from Post-Si 200 that is used to improve the Pre-Si prediction and analysis processes.
5. Post-Si design view (not shown), in order to generate parametric data only available at the IC design stage and re-recreate the decisions for power/performance binning reached at design stage.

EDA Tools—Termed "Lib Sense" 110

Figure 2:
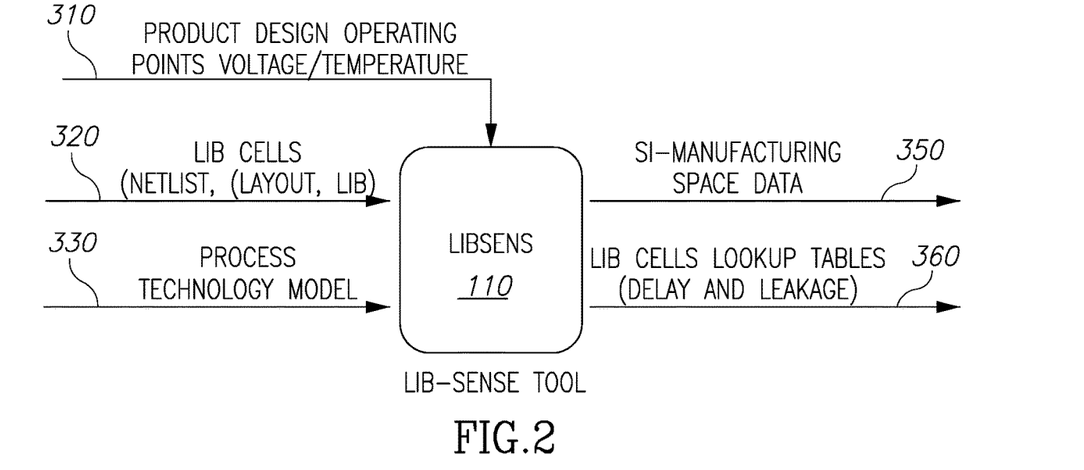
FIG. 2 shows a block diagram of a library sensitivity tool, in accordance with some embodiments.

The Library sensitivity tool (Lib Sense) 110 is illustrated (as a block diagram) in FIG. 2. The tool inputs are:

1. Product operating points 310, i.e. voltages & temperatures.
2. A library 320 of cells, foundation intellectual property cells, like standard cells and memories, including the netlist-data and Lay Out (LO) data for each of the cells in the library.
3. Process technology models 330 (including aging degradation data) of a certain process-technology that is characterized by the device types that are manufactured using the technology (i.e., process, fab, etc.). For example:
   3.1. SVT-type: N or P devices manufactured with standard threshold voltage.
   3.2. LVT-type: N or P devices manufactured with low threshold voltage.
   3.3 ULVT-type: N or P devices manufactured with ultra-low threshold voltage.

The Lib Sense tool 110 operates a circuit-simulation engine/tool 150 (as shown in FIG. 1) to generate a look-up table containing the delay and leakage current for each cell in the library. The leakage current is measured vs. the cell different logic states determined by the logic values of its inputs. The delay is characterized per arc, i.e., delay from input [i] to the output. The tool 110 generates a stimulus for each of the cell input pins such that the input [i] is triggering a transition (fall or rise) at the cell output pin.

To represent the cell-delay & cell-leakage vs. the Si-manufacturing space and input slope, the tool 110 operates circuit-simulation engine/tool 150 in a Monte-Carlo mode to characterize the cell per each Monte-Carlo point (MC-point). Using the MC data, the tool build a de-rate look-up table for each cell. The de-rate data is generated by factorization of each MC-data point with the data of a reference point. The reference point may represent the central manufacturing point, nominal operation voltage, and nominal operational temperature. The reference point may represent other manufacturing points for better accuracy at the manufacturing point of interest. Following is an example of a delay de-rate look-up table generated by the tool for a certain cell per a certain voltage and temperature. The example shows the de-rate values of one cell-arc (rise of a4 input to rising of output z) vs. a few MC points. This data is the data-base for the PSA and "Silicon production view at design" tools.

TABLE 1

De-rate table example

| MC | outpin | inpin | trans | derate |
|---|---|---|---|---|
| 4197 | z | a4 | r2r | 1.030242 |
| 4243 | z | a4 | r2r | 1.071478 |
| 4441 | z | a4 | r2r | 1.105277 |
| 4561 | z | a4 | r2r | 1.049256 |
| 4588 | z | a4 | r2r | 4.075895 |
| 4626 | z | a4 | r2r | 1.07629 |
| 4771 | z | a4 | r2r | 0.931404 |
| 4931 | z | a4 | r2r | 0.929265 |
| −1 | z | a4 | r2r | 0.934217 |
| −2 | z | a4 | r2r | 1.071943 |

The look-up table data may use one or more conversions factors to increase the accuracy of other scenarios, such as different load (FO) or different input slope. Additionally or alternatively, the look-up table may include de-rate factors that represent aging-degradation.

EDA Tools—PSA 120

Figure 3:
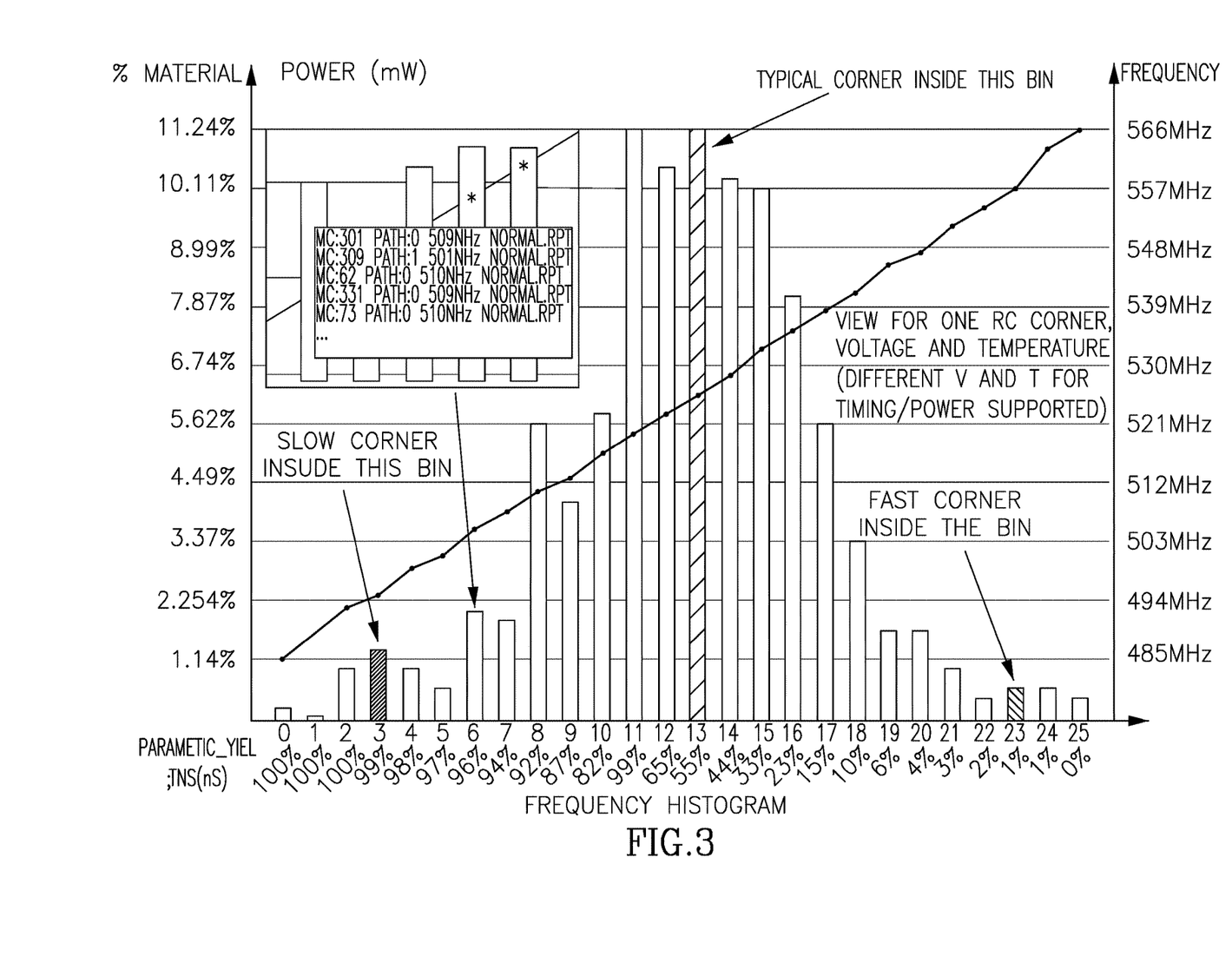
FIG. 3 shows a frequency histogram, in accordance with some embodiments.

The objective of the PSA 120 is to identify Critical-Paths (CP) of an IC over the Si-manufacturing space. These paths will determine the die frequencies at each Si-manufacturing point. The tool generates a list of CPs that may determine the frequency over Si-manufacturing points. Referring to FIG. 3, there is shown a frequency histogram in accordance with an example, with the line plot showing the frequency for each bin and the bars representing the size of the bins.

The inputs for the PSA 120 are:

1. A list of candidate paths generated by a Static-Timing-Analysis (STA) process/EDA-tool and or like. Each path is described by a list of delay-arcs corresponds to a certain logic gate delay and/or Inter-Connect RC-delay.

2. A list of factorized reference arcs-delay generated by the Lib-Sense tool 110 (the de-rate table—FIG. 1). The list includes the delay distribution of each arc-delay in a certain standard cell over 500 MC points, a set of operating voltages, and a set of operational temperatures.

3. Process distribution data representing the Si-manufacturing-space.

PSA Process

Part A: Identify the CPs set:

1. Generating the Si-manufacturing space:

1.1 Computing the process distribution means values and covariance matrix based on the Process distribution data.

2. Sample dies from the Si-manufacturing-space based on:

2.2 Global process variation i.e. using the computed process means values and covariance matrix (mentioned at 1).

2.3 Local variation by sampling from a 2-dimensional mutual Gaussian distribution with sigma depends on the distance.

3. For each sample, the delay of each arc is estimated by a K-NN algorithm, using the 500 MC points. The K-NN may be tuned by cross-validation.

4. The delay of each path is the sum of the delays of the arcs contained in the path.

5. $\in_1$ is defined as the time difference to the slowest path, and $\delta_1$ as the probability to find it. For given $\in_1$ and $\delta_1$, the algorithm returns a set of paths such that at least one of these paths is $\in_1$-slowest in $(1-\delta_1)\times 100\%$ of the times.

Part B: Adding random variation:

6. Perform steps 1-5 above.

7. Duplicate each sample.

8. For each of the instances add random variation to each arc.

9. For each of the samples, compute the delay differences between the sample (with no random) to its instances (that include random).

10. Compute the differences mean value and sigma for each bin (group of samples with similar delays).

Random variation may be added also at part A, step 2.

EDA Tools—Production-View: Silicon Production View at Design

The "silicon production view at design" tool is used to analyze the Post-Si parametric yield of a die for a certain power/performance specification. The Post-Si data may arrive from different Post-Si stages, for example manufacturing and/or burn-in test. The "silicon production view at design" tool is a planning tool which allows to calculate the Post-Si parametric yield (compliance to power/performance specifications) with respect to a certain frequency/power binning at the Pre-Si stage.

The inputs for this tool are:

1. A list of critical paths (CPs) generated by a Static-Timing-Analysis (STA) process/EDA-tool or similar. Each path is described by a list of delay-arcs corresponding to a certain logic gate delay and/or Inter-Connect RC-delay.

2. A list of factorized Reference arcs-delays generated by the Lib-Sense tool. The list includes the delay distribution of each arc-delay in a certain standard cell over 500 MC points, a set of operating voltages, a set of operational temperatures and a set of aging conditions.

3. A list of foundation intellectual property cells, standard cells and memories (Foundation IPs), utilized in the IC digital implementation.

4. A list of factorized Reference leakage-current values per cell generated by the Lib-Sense tool.

5. Active-power generated by a power-analysis tool.

6. Process distribution data representing the Si-manufacturing-space.

This tool uses the CPs set (1) and the operational voltages and temperature sets to build a CP's delay. Timing traces from the STA will generate new STA models for a specific Monte-Carlo point, voltage point and temperature point. An example for a CP delay representation (i.e. some delay-arcs vs. MC point at a certain operational point) is shown in the table below:

TABLE 2

| | | | CP delay | | | | | | |
|---|---|---|---|---|---|---|---|---|---|
| | | | | Arc Index | | | | | |
| MCIndex | pathID | L_total_delay | 12450 | 0 | 12451 | 1 | 12452 | 2 | 12453 |
| −2 | 0 | 1.966897259 | 0.0084 | 0.0243 | 0.0039 | 0.0253 | 0.0033 | 0.0257 | 0.0092 |
| −1 | 0 | 1.692783937 | 0.0084 | 0.0243 | 0.0039 | 0.0218 | 0.0033 | 0.0221 | 0.0092 |
| 0 | 0 | 1.822567 | 0.0084 | 0.0243 | 0.0039 | 0.0233 | 0.0033 | 0.0237 | 0.0092 |
| 1 | 0 | 1.822560113 | 0.0084 | 0.0243 | 0.0039 | 0.0233 | 0.0033 | 0.0237 | 0.0092 |
| 2 | 0 | 1.819079828 | 0.0084 | 0.0243 | 0.0039 | 0.0235 | 0.0033 | 0.0239 | 0.0092 |
| 3 | 0 | 1.784229397 | 0.0084 | 0.0243 | 0.0039 | 0.0228 | 0.0033 | 0.0233 | 0.0092 |
| 4 | 0 | 1.837086333 | 0.0084 | 0.0243 | 0.0039 | 0.0235 | 0.0033 | 0.0239 | 0.0092 |
| 5 | 0 | 1.787367378 | 0.0084 | 0.0243 | 0.0039 | 0.0228 | 0.0033 | 0.0232 | 0.0092 |

| | | | Arc Index | | | | | |
|---|---|---|---|---|---|---|---|---|
| MCIndex | pathID | L_total_delay | 3 | 12454 | 4 | 12455 | 5 | 12456 |
| −2 | 0 | 1.966897259 | 0.0548 | 0.0088 | 0.0813 | 0.0106 | 0.0248 | 0.0082 |
| −1 | 0 | 1.692783937 | 0.0437 | 0.0088 | 0.06 | 0.0106 | 0.0214 | 0.0082 |
| 0 | 0 | 1.822567 | 0.0476 | 0.0088 | 0.0694 | 0.0106 | 0.023 | 0.0082 |
| 1 | 0 | 1.822560113 | 0.0476 | 0.0088 | 0.0694 | 0.0106 | 0.023 | 0.0082 |
| 2 | 0 | 1.819079828 | 0.0453 | 0.0088 | 0.0661 | 0.0106 | 0.023 | 0.0082 |
| 3 | 0 | 1.784229397 | 0.046 | 0.0088 | 0.0658 | 0.0106 | 0.0226 | 0.0082 |
| 4 | 0 | 1.837086333 | 0.0479 | 0.0088 | 0.0704 | 0.0106 | 0.0232 | 0.0082 |
| 5 | 0 | 1.787367378 | 0.0449 | 0.0088 | 0.0645 | 0.0106 | 0.0226 | 0.0082 |

This tool uses the list of foundation IPs instances utilized in the IC design to generate the leakage power data base.

The power database is the sum of leakage-power and the active-power. The total leakage power may be calculated by summing up the leakage power of all the foundation IP instances in the specific IC design. More details are described in U.S. Provisional Patent Application No. 62/657,986, entitled "Integrated Circuit Profiling and Anomaly Detection", filed Apr. 16, 2018 and International (PCT) Patent Application no. PCT/IL2019/050433, entitled "Integrated Circuit Profiling and Anomaly Detection", filed Apr. 16 2019, both of which are incorporated herein by reference in their entirety.

For example, the total leakage of a specific IC design may be generated as the total leakage measurement as the sum of all cell's leakage:

$$\text{Total leakage}|PVT = V \times \Sigma_{all\ cells} I_{off}(i)|PVT$$

This tool first builds the frequency and/or power binning at the nominal operation point (for example, as shown with reference to FIG. 3, 4 or 5, in which frequency binning is shown or as shown with reference to FIG. 4, in which power binning is shown, as discussed below), then allows the user to probe the database with "What-If" queries. The "What-If" queries generate different yield vs. power/performance scenarios. Each frequency bucket in the histogram corresponds to a group of MC-points which relates to a set of CPs. The Slow process corner and the Fast process corner are also part of the histogram.

Figure 4:
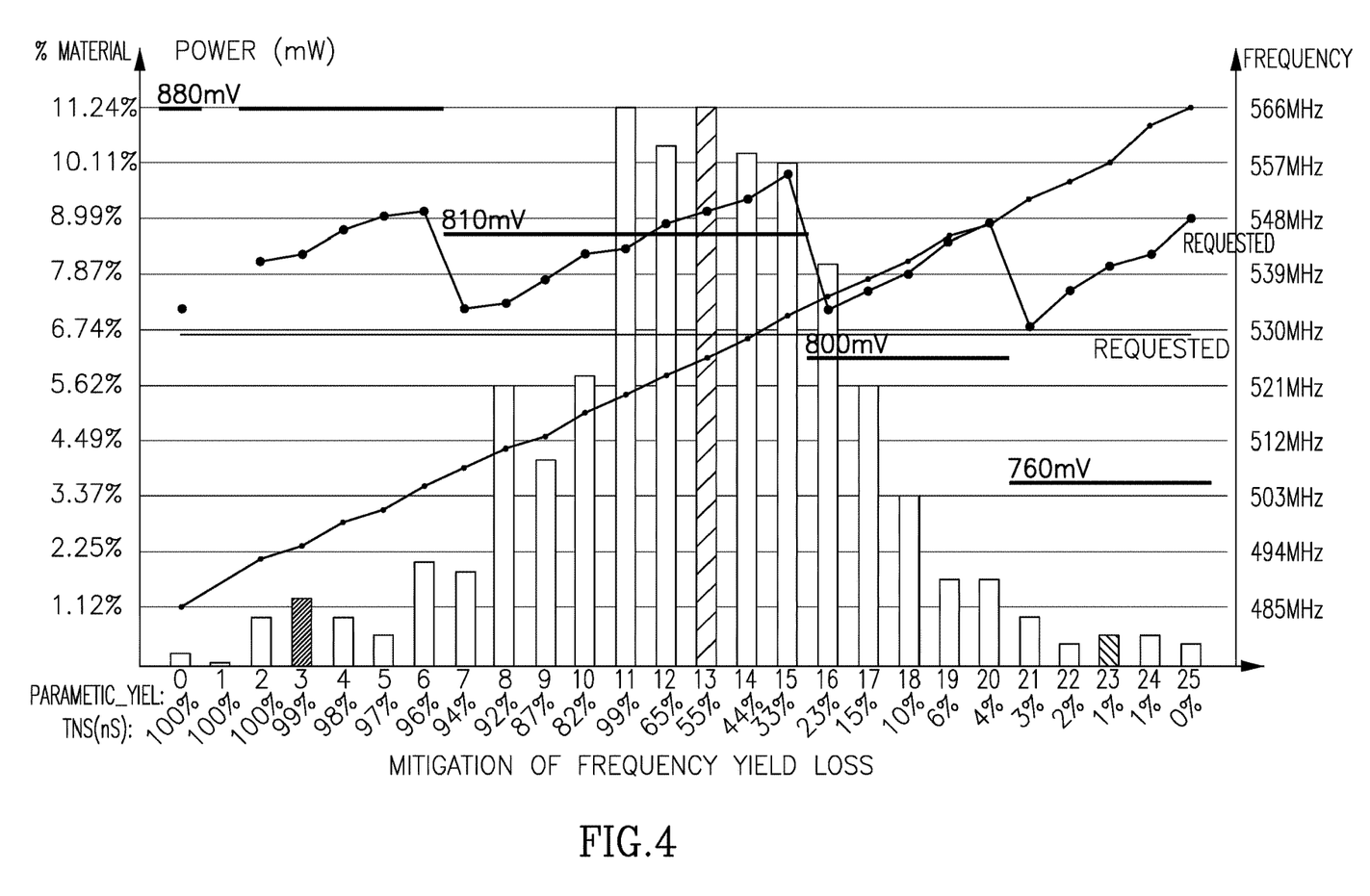
FIG. 4 shows another frequency histogram, in accordance with some embodiments.
Figure 5:
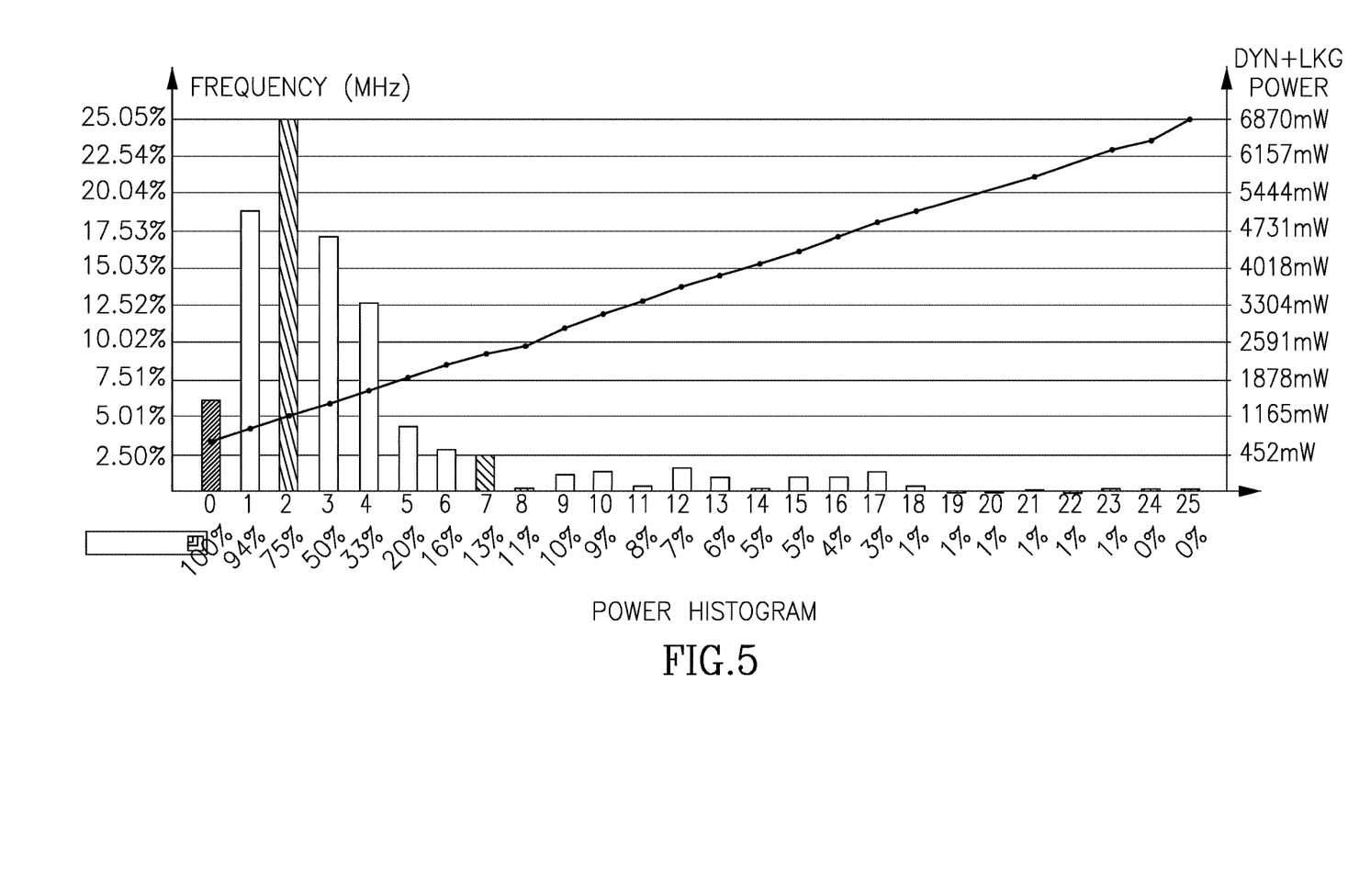
FIG. 5 shows a power histogram, in accordance with some embodiments.
Figure 6:
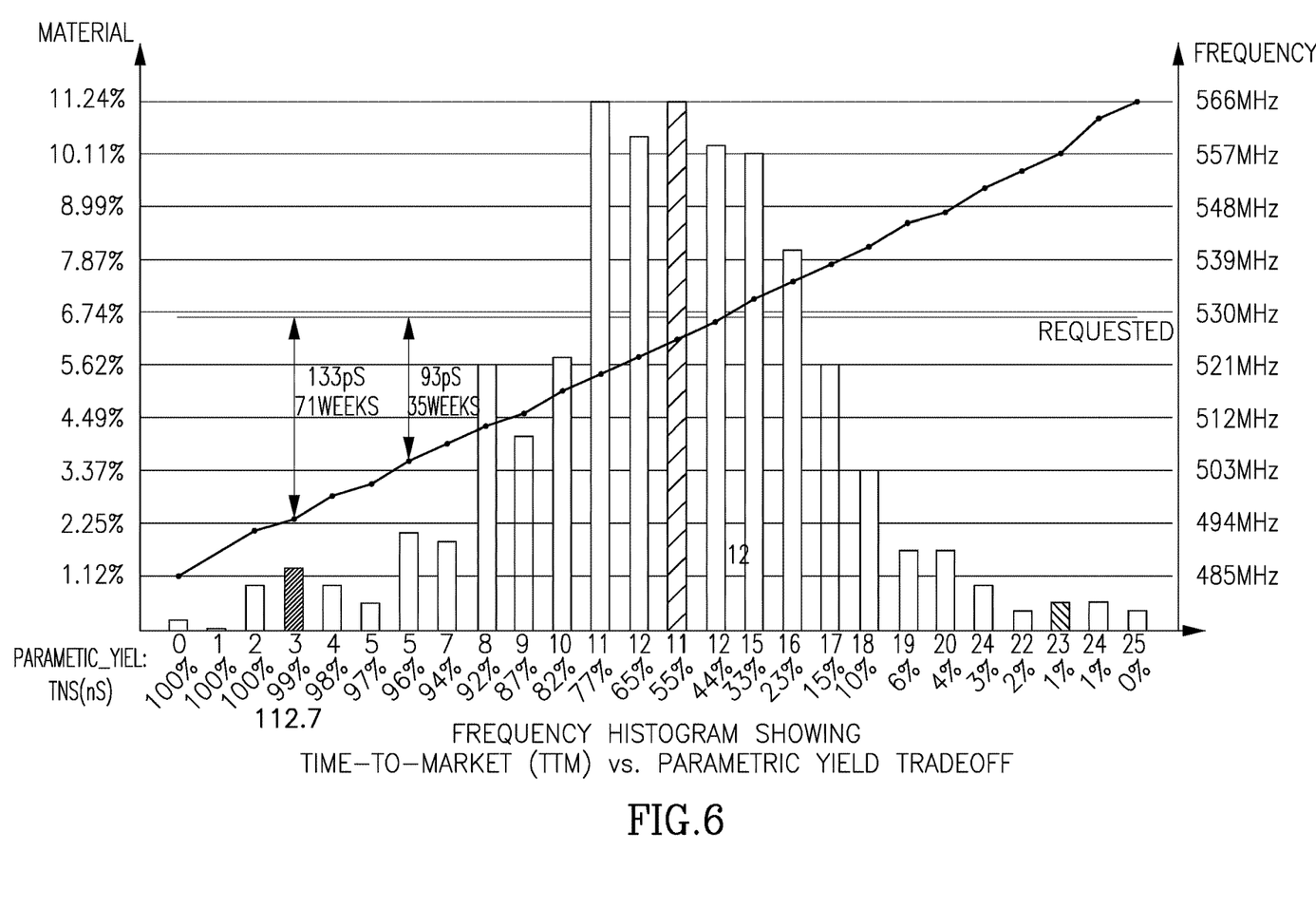
FIG. 6 shows a further frequency histogram, in accordance with some embodiments.

Three examples are shown with reference to FIG. 4, FIG. 5 and FIG. 6. FIG. 4 shows the frequency histogram of FIG. 3, used in an example of a Pre-Si yield-loss mitigation process. By increasing (up-driving) the voltage for devices in material bins having a predicted Fmax (maximum frequency) that is below the target frequency (in this case approximately 530 MHz), the yield loss is saved. FIG. 5 shows a power histogram, illustrating power binning of the IC. A power yield-loss may be mitigated by reducing the operational voltage of devices in the high-power bins. In the third example (FIG. 6), the frequency histogram of FIG. 3 is used to illustrate a Time-To-Market (TTM) view of the what-if analysis. This demonstrates a tradeoff between parametric yield loss and effort measured in workweeks (WW) with respect to a frequency target. By trading off 4% parametric yield-loss at a 530 MHz target frequency, the TTM can be reduced by 35WWs.

Sensors/Agents 210

These are circuits that are used to sense or measure a certain device parameter, a sub-circuit parameter, a die-level parameter, and/or the like. For example, a sensor measures the delay of a certain logic cell.

Following are examples of sensor/agent circuits (hereinafter, for simplicity, "sensors").

Figure 7:
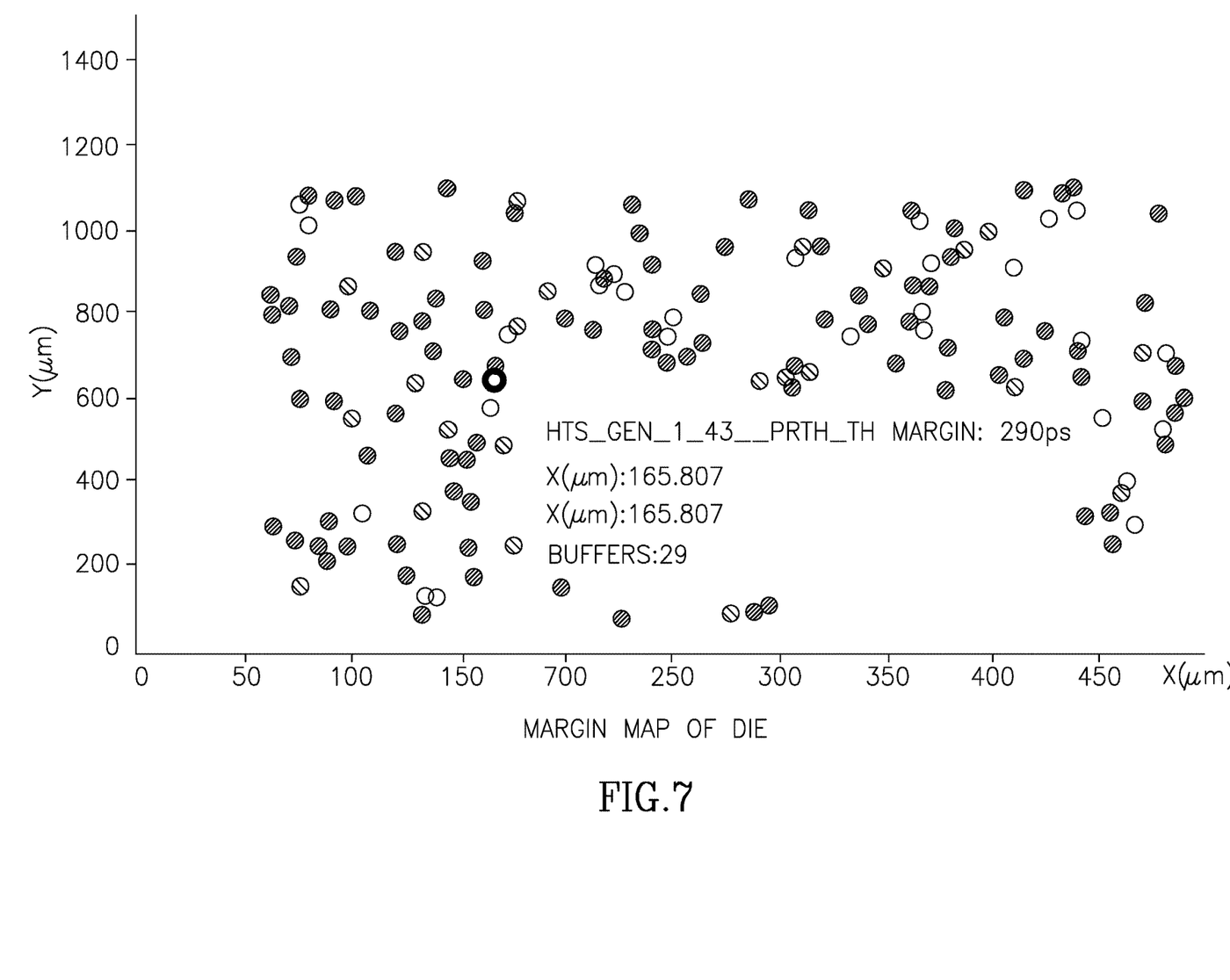
FIG. 7 shows a margin map of a die, in accordance with some embodiments.

A timing-margin sensor generates Margin Maps at many points in the IC. FIG. 7 shows an example Margin Map of a die. The Margin Maps may have generated by the timing margin detection circuits described in the U.S. Provisional Patent Application No. 62/586,423, filed Dec. 5, 2017, entitled "Integrated Circuit Failure Prediction Device" and International (PCT) Patent Application no. PCT/IL2018/051234, filed Nov. 15, 2018, entitled "Integrated Circuit Margin Measurement and Failure Prediction Device", both of which are incorporated herein by reference in their entirety. This is also described in the aforementioned '986 application and corresponding PCT application.

A delay sensor may sense the delay of a certain logic cell. It may be implemented by a ring-oscillator circuit whose frequency reflects the average delay of the logic cells.

Another delay-sensor may sense the delay of the rising-edge of a certain logic cell and the falling-edge of a logic cell in a separate way.

A further delay sensor may sense the RC-delay per-metal or per a subset of metals and or like.

A leakage-sensor may be used to sense the leakage of a certain P-device and a certain N-device in separate ways, as described in U.S. Provisional Patent Application No. 62/614,706, entitled "Integrated Circuit Sub-Threshold Leakage Sensor" and International (PCT) Patent Application no. PCT/IL2019/050039, filed Jan. 8, 2019, entitled "Integrated Circuit Workload, Temperature and/or Sub-Threshold Leakage Sensor", both of which are incorporated herein by reference in their entirety.

A voltage sensor may sense the absolute DC-voltage, or the instantaneous AC-voltage (negative peak, positive peak and peak-to-peak) of a point in the Si.

A Thermal sensor may sense the absolute temperature, or the instantaneous temperature (negative peak, positive peak, and peak-to-peak) of a point in the Si. Examples of a thermal sensor are discussed with reference to the leakage sensor mentioned above.

ML Tools—CP Estimator Generator 230

An estimator is a function and/or rule that converts between values (i.e., defines the relationships between the die operational values analytically, empirically, heuristically, etc.), such as using sensor values as input arguments to determine CPs delays, die power consumption, a profile (profile classifier), predicted High Coverage Measurement (HCM) values (HCM conversion function), predict manufacturing point, and/or the like. As used herein, the term "manufacturing point" means the set of parameters that determine the manufacturing of the IC design. Similar relationships may be found between HCM values and sensor values. The results of the die testing and analysis may better determine the specific dies that may operationally meet or exceed the engineering specifications.

Post-Si Feedback Data 200

When a certain die is tested, the tester reads values from its sensors. In addition, the IC is tested against an Fmax limit and power consumption (active-power and leakage-power-IDDQ) is actually measured from the IC for a specific production test.

The values from the sensors are used as an input data for:

1. The profiling-block described in the '986 application and corresponding PCT application. The profiling block classifies the die per its Si-manufacturing point.

2. The estimator block, which computes the Pre-Si CP's delay estimators, the die power consumption estimator, and the Si-manufacturing point using the sensor data as its arguments.

3. A direct parametric measurement, such as timing margin at many different areas in the IC.

The estimator block may generate one or more of the following outputs by the Post-Si estimators:

1. The die maximum frequency.
2. The die power consumption.
3. Die Si-manufacturing point.

Additional data generated by the sensors read, as a direct parametric measurement:

4. Die timing-margin map at many different points in the IC.

Post processing of 1, 2, 3 is used to build the die Post-Si frequency/power consumption-binning per Si manufacturing groups/families and interconnect models.

These, together with 4, create the "Design view at Post-Si stage". This view generates data from design at Post-Si stage per device, as stated above, which until now is unavailable.

The following data, or a part thereof, is feedback to the Pre-Si processes per each die:

1. Post-Si CP's list.
2. Post-Si power consumption of the dies.
3. Die Si-manufacturing profile/point.
4. Post-Si CP's Fmax estimator results.
5. Post-Si Voltage-droop measurements and local hot-spots.
6. Post-Si timing-margin at many different points in the IC.

The feedback data allows to correlate Post-Si results with Pre-Si models, improve Pre-Si models and assumptions for further designs, and/or improve Post-Si tests, testing conditions and coverage.

Post-Si Binning and or Performance/Power Test Against Specification—Parametric Yield Improvements 140

At manufacturing-testing stage the Post-Si data (1-6), is used to actually perform the power/performance binning decisions as decided in the "Silicon production view at design" tool analysis. Providing the same visibility and good decision making both at design and as Post-Si stage, and maximizing the parametric yield according to the decisions taken in the design stage.

Timing-margin maps are used to analyze the IC behavior on different production tests, find "hot spots", compare different production tests "stress" and coverage and use as a feedback to the Pre-Si models.

In a general sense, there may be considered a method operative on a hardware processor (or multiple hardware processors) comprising: running a Monte Carlo simulation of possible integrated circuit (IC) process variations of each of a plurality of IC cell types, wherein each of the plurality of IC cell types is defined by multiple specific transistors and multiple specific interconnects; based on the results of the Monte Carlo simulation, creating a library of IC cell types and their corresponding behavioral values for each of the possible IC process variations, and storing the library in a non-transient memory; and receiving an IC design at the hardware processor, particularly embodied as a digital file. The library of IC cell types advantageously comprises one or more models (such as one or more operational models) for each IC cell type. The Monte Carlo simulation may be implemented in accordance with one or more models of each of the plurality of IC cell types. Each model may include aging degradation data. The results of the Monte Carlo simulation may be de-rated, by factorization of each data point from the results of the Monte Carlo simulation with data of a respective reference point. The reference point may represent a central manufacturing point, nominal operation voltage, and nominal operational temperature, for example. The one or more models of each of the plurality of IC cell types may include a Static Timing Analysis (STA) model of each of the plurality of IC cell types.

In a first aspect, the method may further comprise: correlating the received IC design with the library; and predicting a frequency distribution and/or a power distribution of ICs manufactured according to the IC design. This approach may allow improved data regarding the manufacturing process to be obtained. The data may be fed back into the manufacturing process and/or operation of the manufactured ICs. This may be a form of product binning, in which ICs can be categorized in accordance with their characteristics. The binning is performed using Pre-Si (simulation and design) data, but Post-Si data (which may be derived from IC measurements) may additionally be used.

In a second aspect, the method may further comprise: applying a path selection algorithm to the IC design, wherein the applying comprises: retrieving, from the library, behavioral values that pertain to cell types that exist in the IC design. A result of the path selection algorithm may include a list of paths in the IC design and optionally an identification of critical paths. A Path-Sensitivity-Analysis (PSA) tool may thereby be provided. In embodiments, the method may further comprise: running an electronic circuit simulation (for example, using performed using Simulation Program with Integrated Circuit Emphasis, SPICE) to produce possible IC process variations, based on the behavioral values retrieved from the library. A ranked list of critical paths may be identified, out of the paths in the IC design. In particular, the ranked list of critical paths may be based on the behavioral values retrieved from the library (the expended Lib data, especially at many MC points). Moreover, the ranked list of critical paths may be based on the STA model, allowing STA data to be expanded over the manufacturing process space. The CPs may then be used to improve the manufacturing process and/or operation of the manufactured ICs. For example, a frequency distribution and/or a power distribution of ICs manufactured according to the IC design may be predicted, based on the ranked list of critical paths (such as discussed above with respect to the first aspect).

According to any aspect, it may be considered that the behavioral values are values that affect at least one operational parameter of an IC manufactured based on the IC design. For example, the at least one operational parameter may be selected from the group consisting of: voltage, current, delay, and frequency.

In embodiments, Post-Si data may be used. For example, Post-Si data, derived from ICs manufactured according to the IC design, may be received. The stored library may be adjusted based on the received data. For instance, this may include one or more of: correlating Post-Si results with Pre-Si models; improving Pre-Si models and/or assumptions for further designs; and improving Post-Si tests, testing conditions and coverage.

In embodiments, an on-chip measurement may be received from ICs manufactured according to the IC design. Then, the on-chip measurement may be used as an input to an estimator. Post-Si data may be provided as an output from the estimator. The estimator may also use Pre-Si data (such as models and/or simulation data). An estimator may be used to provide CP delay information, for example.

The Post-Si data is derived from one or more on-chip sensors (such as agents, as discussed herein). The one or more on-chip sensors may comprise at least one of: a timing-margin sensor; a delay sensor; a leakage sensor (for example, based on a ring oscillator); a voltage sensor; and a thermal sensor.

In embodiments, one or more manufacturing parameters may be set based on the stored library, such as model data and/or behavioral values retrieved from the library (including information derived from the behavioral values such as the frequency distribution, power distribution and/or CPs). For example, this may result in a reduction in production times to achieve a specific frequency target. ICs may be manufactured according to the IC design and the manufacturing parameters accordingly.

In embodiments, the method may further comprise: manufacturing ICs according to the IC design. Then, one or more operational parameters (such as operational voltage and/or frequency) of the manufactured ICs may be set based on the stored library, such as model data and/or behavioral values retrieved from the library (including information derived from the behavioral values such as the frequency distribution, power distribution and/or CPs). For example, reducing the operational voltage of devices may reduce yield-loss in some circumstances. In such embodiments, the model data is beneficially improved or updated based on Post-Si data.

The present invention may be a system (which may include a manufacturing and/or testing apparatus), a method, and/or a computer program product. The computer program product may include computer readable program instructions for causing (or configured to cause) a processor to carry out aspects of the present invention. A computer readable storage medium (or media) may have the computer readable program instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising using at least one hardware processor for:
   running a Monte Carlo simulation of possible integrated circuit (IC) process variations of each of a plurality of IC cell types;
   based on results of the Monte Carlo simulation, creating a library of IC cell types and their corresponding behavioral values for each of the possible IC process variations;
   receiving an IC design embodied as a digital file;
   correlating the received IC design with the library; and
   based on said correlating, predicting at least one of:
      a frequency distribution, or
      a power distribution,
   of ICs manufactured according to the IC design.

2. The method according to claim 1, wherein each of the plurality of IC cell types is defined by multiple specific transistors and multiple specific interconnects.

3. The method according to claim 1, wherein said correlating comprises retrieving, from the library, behavioral values that pertain to cell types that exist in the IC design.

4. The method according to claim 3, further comprising:
   running an electronic circuit simulation of the IC design to identify possible IC process variations, based on the behavioral values retrieved from the library.

5. The method according to claim 1, further comprising, based on said correlating:
   predicting critical paths that limit a frequency of the ICs manufactured according to the IC design,
   wherein said predicting of at least one of the frequency distribution and the power distribution is based on said critical paths prediction.

6. The method according to claim 5, further comprising:
   identifying a ranked list of the critical paths, out of paths in the IC design, based on the behavioral values retrieved from the library.

7. The method according to claim 1, wherein the behavioral values are values that affect at least one operational parameter of an IC manufactured based on the IC design, wherein the at least one operational parameter is selected from the group consisting of: voltage, current, delay, and frequency.

8. The method according to claim 1, wherein the library of IC cell types comprises an operational model for each IC cell type, the operational model comprising aging degradation data and a Static Timing Analysis (STA) model.

9. The method according to claim 1, further comprising:
   receiving Post-Si data, derived from ICs manufactured according to the IC design; and
   adjusting the library based on the received Post-Si data.

10. The method according to claim 9, further comprising:
    receiving on-chip measurements from ICs manufactured according to the IC design, wherein the on-chip measurements are derived from one or more on-chip sensors of each of the manufactured ICs, wherein the one or more on-chip sensors comprise at least one of: a timing-margin sensor, a delay sensor, a leakage sensor, a voltage sensor, and a thermal sensor; and
    using the on-chip measurements as an input to an estimator, the Post-Si data being provided as an output from the estimator.

11. The method according to claim 1, further comprising:
(a) manufacturing ICs according to the IC design; and setting one or more operational parameters of the manufactured ICs based on the stored library; or
(b) setting one or more manufacturing parameters based on the stored library, and manufacturing ICs according to the IC design and the manufacturing parameters.

12. A system comprising:
(a) at least one hardware processor; and
(b) a non-transitory computer-readable storage medium having program code embodied therewith, the program code executable by said at least one hardware processor to:
run a Monte Carlo simulation of possible integrated circuit (IC) process variations of each of a plurality of IC cell types,
based on results of the Monte Carlo simulation, create a library of IC cell types and their corresponding behavioral values for each of the possible IC process variations;
receive an IC design embodied as a digital file;
correlate the received IC design with the library, and based on said correlating, predict at least one of:
a frequency distribution, or
a power distribution,
of ICs manufactured according to the IC design.

13. The system according to claim 12, wherein each of the plurality of IC cell types is defined by multiple specific transistors and multiple specific interconnects.

14. The system according to claim 12, wherein said correlating comprises retrieving, from the library, behavioral values that pertain to cell types that exist in the IC design.

15. The system according to claim 14, wherein the program code is further executable to:
run an electronic circuit simulation of the IC design to identify possible IC process variations, based on the behavioral values retrieved from the library.

16. The system according to claim 12, wherein the program code is further executable, based on said correlating, to:
predict critical paths that limit a frequency of the ICs manufactured according to the IC design,
wherein said predicting of at least one of the frequency distribution and the power distribution is based on said critical paths prediction.

17. The system according to claim 16, wherein the program code is further executable to:
identify a ranked list of the critical paths, out of paths in the IC design, based on the behavioral values retrieved from the library.

18. The system according to claim 12, wherein the behavioral values are values that affect at least one operational parameter of an IC manufactured based on the IC design, wherein the at least one operational parameter is selected from the group consisting of: voltage, current, delay, and frequency.

19. The system according to claim 12, wherein the library of IC cell types comprises an operational model for each IC cell type, the operational model comprising aging degradation data and a Static Timing Analysis (STA) model.

20. The system according to claim 12, wherein the program code is further executable to:
receive on-chip measurements from ICs manufactured according to the IC design, wherein the on-chip measurements are derived from one or more on-chip sensors of each of the manufactured ICs, wherein the one or more on-chip sensors comprise at least one of: a timing-margin sensor, a delay sensor, a leakage sensor, a voltage sensor, and a thermal sensor; and
operate an estimator to output Post-Si data based on the on-chip measurements; and
adjust the library based on the Post-Si data.

* * * * *